3,038,887
Patented June 12, 1962

3,038,887
NORCAMPHANYL ESTERS OF α,β-UNSATURATED DICARBOXYLIC ACIDS AND POLYMERS THEREOF
John R. Caldwell, Winston J. Jackson, Jr., and Edward H. Hill, Kingsport, Tenn., assignors to Eastman Kodak Company, Rochester, N.Y., a corporation of New Jersey
No Drawing. Filed Mar. 12, 1959, Ser. No. 798,810
6 Claims. (Cl. 260—78.5)

This invention relates to norcamphanyl esters of α,β-monoethylenically unsaturated aliphatic dicarboxylic acids, and more particularly to such esters of maleic, fumaric and itaconic acids, to polymers thereof, and to the preparation of the same.

It is known that unsaturated bicyclic alcohols such as 2,5-endomethylene Δ³ tetrahydrobenzyl alcohol can be condensed with α,β-unsaturated dicarboxylic acids to give esters containing several ethylenic linkages which on polymerization give thermosetting resins. Accordingly, such resins have but limited utility. We have now found that by employing a saturated bicyclic alcohol, for example, a norcamphanyl alcohol with α,β-unsaturated dicarboxylic acids, the resulting esters contain but a single ethylenic linkage and are readily polymerizable to thermoplastic resins having a wide variety of uses.

The new class of unsaturated esters of the invention are represented by the following general formulas:

I
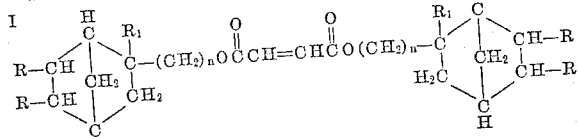

and
II
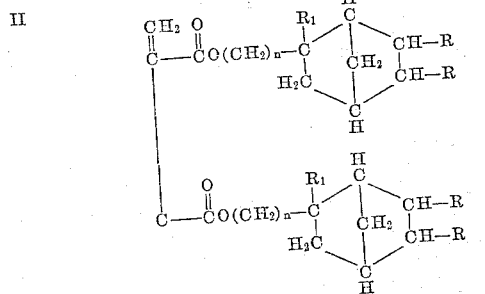

wherein $n$ represents an integer of 0 or 1, each R represents the same member such as an atom of hydrogen or an alkyl group of 1–4 carbons such as methyl, ethyl, propyl, isopropyl, butyl, etc. groups, and each $R_1$ represents the same member such as an atom of hydrogen or a methyl group. These monomers are useful as chemical intermediates for the preparation of various derivatives thereof and are especially valuable as intermediates for preparing resinous thermoplastic polymers that are useful for the manufacture of films, fibers, sheets, tubes, molded objects and as oil additives. Such resinous thermoplastic polymers are soluble in common organic solvents such as carbon tetrachloride, chloroform, benzene, toluene, mineral oils, tertiary butyl alcohol, higher esters of phthalic acid, etc., but insoluble in solvents such as water, acetone, methanol, acetonitrile, cellosolve, and the like. They vary from soft gums represented by the homopolymers to materials having melting points up to about 250° C. represented by various copolymers which on molding give clear, hard molded objects or flexible, tough films, fibers and sheets.

It is, accordingly, an object of the invention to provide unsaturated esters represented by the above Formulas I and II. Another object is to provide useful thermoplastic polymers of the same. Another object is to provide polymeric materials that have utility as oil additives, as filmmeric materials and as molding compositions. Another object is to provide processes for the preparation of the monomers and polymers thereof. Other objects will become apparent hereinafter.

In accordance with the invention, we prepare our new monomeric compounds by refluxing one molecular proportion of a dicarboxylic acid such as maleic acid, fumaric acid, itaconic acid, maleic anhydride, etc. with at least two molecular proportions of a hydroxycamphanyl compound represented by the general formula:

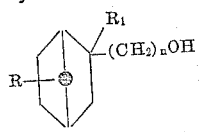

wherein $n$, R and $R_1$ are as previously defined, in an inert hydrocarbon medium such as benzene, toluene, xylene, etc., in the presence of an acidic catalyst such as sulfuric or toluenesulfonic acids. The water formed in the reaction is removed, for example, as the benzene azeotrope and collected in a Dean-Stark trap. The reaction is completed when no more water is obtained. A slight excess of the alcohol is advantageously employed to ensure completion of the reaction. Esterification can also be carried out by heating the acid or anhydride, the alcohol (in excess) and the acidic catalyst for several hours at 150° C. in an autoclave. However, the previously described method employing benzene as the reaction medium is preferred primarily because higher yields are obtained and less alcohol is required.

The polymerizations for preparing the resinous thermoplastic polymers of the invention may be carried out conveniently in an organic solvent such as one of the lower alcohols, ketones or esters or in a hydrocarbon such as benzene, toluene or hexane. Mass or bulk polymerizations may also be used. The polymerizations can also be carried out by dispersing the monomers in water and adding suitable dispersing agents. Catalysts, heat and actinic light accelerate the reactions. Suitable catalysts that can be used alone or in admixture include peroxides such as benzoyl peroxide, acetyl peroxide, lauroyl peroxide, tertiary butyl hydroperoxide, hydrogen peroxide, etc., persulfates such as sodium, potassium and ammonium persulfates, perborates such as sodium and potassium perborates, etc. Azobis-isobutyronitrile may also be employed as a catalyst. The amount of catalyst used can vary from about 0.1 to 3.0%, based on the weight of monomer to be polymerized. The temperature can vary over a wide range e.g. from 20°–130° C., but preferably the polymerizations are carried out at from about 50°–70° C. The polymerizations can be carried out by batch or continuous processes at atmospheric or higher pressures. If desired, an inert atmosphere such as nitrogen can be maintained in the reaction vessel. When carried out in a nonsolvent medium such as water, an activating agent such as an alkali metal bisulfite e.g. sodium or potassium bisulfite may advantageously be employed. Also, it is advantageous in an aqueous system to employ surface active agents such as fatty alcohol sulfates e.g. sodium or potassium cetyl sulfate, sodium or potassium lauryl sulfate, etc., aromatic sulfonates e.g. sodium or potassium salts of alkylnaphthalene sulfonic acid, sulfonated oils, and the like. These surface active agents may be employed up to about 3–5% of the weight of the monomer to be polymerized. If desired, a chain regulator such as an alkyl mercaptan e.g. hexyl, cetyl, lauryl, myristyl, etc. mercaptans, can be employed.

For preparing the resinous thermoplastic copolymers of the invention, a mixture comprising at least one of the monomeric unsaturated esters of the invention represented by above Formulas I and II and one or more polymerizable compounds containing but a single olefinic unsaturation represented by a >C=C< group is polymerized by the above described processes. While any proportions can be employed, preferably the proportions are from 10–90% by weight of the unsaturated esters of the invention and conversely from 90–10% by weight of the vinyl comonomer. In general, the resulting copolymers have approximately the same composition of components as contained in the starting polymerization reaction mixtures. Suitable polymerizable comonomers include acrylic and methacrylic alkyl esters wherein the alkyl groups contains from 1–4 carbon atoms e.g. methyl, ethyl, propyl, isopropyl, butyl, etc. acrylates and methacrylates, acrylic and methacrylic acid amides including N-alkyl and N,N-dialkyl substituted amides thereof wherein the alkyl group in each instance contains from 1–4 carbon atoms e.g. acrylamide, methacrylamide, N-methyl acrylamide, N-n-butyl acrylamide, N,N-dimethyl acrylamide, N,N-dipropyl acrylamide, etc. and the corresponding alkyl substituted methacrylamides, vinyl and isopropenyl esters of monobasic saturated fatty acids containing from 2–18 carbon atoms e.g. vinyl acetate, vinyl propionate, vinyl butyrate, vinyl stearate, etc., and corresponding isopropenyl esters, vinyl alkyl ethers wherein the alkyl group contains from 1–4 carbon atoms e.g. vinyl methyl ether, vinyl ethyl ether, etc., vinyl alkyl ketones wherein the alkyl group contains from 1–4 carbon atoms e.g. vinyl methyl ketone, vinyl butyl ketone, etc., unsaturated nitriles e.g. acrylonitrile, methacrylonitrile, etc., vinyl derivatives of benzene e.g. styrene, α-methylstyrene, p-acetaminostyrene, etc., vinyl and vinylidene halides e.g. vinyl chloride, vinyl fluoride, vinylidene chloride, vinylidene fluoride, etc., tetrafluoroethylene, chloro-trifluoroethylene, N-vinyl imides such as N-vinyl succinimide, N-vinyl phthalimide, etc., N-vinyl lactams e.g. N-vinyl pyrrolidone, N-vinyl piperidone, etc., α-olefins containing from 2–8 carbon atoms e.g. ethylene, isobutylene, etc., acrylic and methacrylic acids, and monoalkyl and dialkyl esters of α,β-unsaturated dicarboxylic acids wherein the alkyl group contains from 1–4 carbon atoms e.g. methyl maleate, butyl maleate, dimethyl maleate, dibutyl maleate, etc., and corresponding esters of fumaric, itaconic and citraconic acids, and the like.

The following examples will serve to illustrate further the new monomers, polymers thereof and the manner of their preparation and uses.

EXAMPLE 1

A mixture containing 58 g. (0.50 mole) of fumaric acid 118 g. (1.05 moles) of 2-norcamphanol, 10 g. of p-toluenesulfonic acid and 500 ml. of benzene was refluxed for 48 hours. The water which formed in the reaction was collected in a Dean-Stark trap attached to a short Vigreux column. The benzene solution was cooled, washed with sodium bicarbonate solution, dried with anhydrous sodium sulfate and concentrated on a steam bath. The solid product, recrystallized from ethanol, yielded white crystals, m.p. 88°–90° C., of bis(2-norcamphanyl) fumarate represented by the following structural formula:

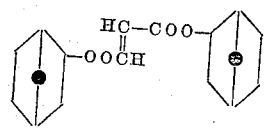

EXAMPLE 2

A mixture containing 116 g. (1.0 mole) of fumaric acid, 258 g. (2.05 moles) of 2-norcamphanemethanol, 300 ml. of benzene and 10 g. of p-toluenesulfonic acid was refluxed for 13 hours. The water was removed with a Dean-Stark trap attached to a short Vigreux column. After the reaction mixture was worked up as in Example 1, the product was recrystallized from isopropanol to give 290 g. (87% yield) of white crystals melting at 80°–82° C., of bis(2-norcamphanylmethyl) fumarate represented by the following structural formula:

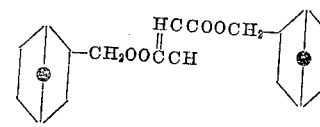

EXAMPLE 3

Bis(2-norcamphanyl) maleate was prepared from maleic acid and 2-norcamphanol according to the procedure of Example 1. This ester was a colorless liquid, B.P. 195–198° C./2 mm.

EXAMPLE 4

Bis(2-norcamphanylmethyl) maleate was prepared from maleic anhydride and 2-norcamphanemethanol according to the procedure of Example 1. This ester was a colorless liquid, B.P. 206°–209° C./3 mm.;

$n_D^{20}$ 1.5073

EXAMPLE 5

Bis(2-methyl-2-norcamphanyl) maleate was prepared from maleic anhydride and 2-methyl-2-norcamphanol according to the procedure of Example 1. This ester distilled at 202°–206° C./2 mm.

EXAMPLE 6

Bis(2,3-dimethyl-2-norcamphanylmethyl) maleate was prepared from maleic anhydride and 2,3-dimethyl-2-norcamphanemethanol according to the procedure of Example 2. This ester was a colorless liquid which boiled at 222°–226° C./3 mm.

EXAMPLE 7

Bis(2-norcamphanylmethyl) itaconate was prepared from itaconic acid and 2-norcamphanemethanol according to the procedure of Example 2. This ester distilled at 204°–206° C./3 mm.

EXAMPLE 8

A mixture of 25 g. of bis(2-norcamphanylmethyl) itaconate, 200 ml. of tert.-butyl alcohol and 0.3 g. of benzoyl peroxide was tumbled in a pressure bottle at 70° C. for 12 hours. A yield of 22 g. of soft gum identified as poly-bis(2-norcamphanylmethyl) itaconate.

In place of the bis(2-norcamphanylmethyl) itaconate, there may be substituted a like amount of any other of the mentioned unsaturated esters of the invention to give homopolymers of generally similar physical characteristics, for example, poly-bis(2-norcamphanyl) fumarate, poly-bis(2-norcamphanyl) maleate, poly-bis-(2-norcamphanyl) itaconate, poly-bis(2-norcamphanylmethyl) fumarate, poly-bis(2-norcamphanylmethyl) maleate, and the like.

EXAMPLE 9

A mixture of 16.5 g. (0.05 mole) of bis(2-norcamphanylmethyl)fumarate, 15.5 g. (0.05 mole) of vinyl stearate, 150 ml. of tert.-butyl alcohol and 0.5 g. of benzoyl peroxide was heated in a 250-ml. flask at reflux for 18 hours. A clear, soft gum was obtained which was purified by dissolving in benzene and precipitating in acetonitrile several times. The yield of polymer was 91%. It consisted of approximately 51% by weight of recurring units of the fumarate component, the remainder of the polymer molecule being recurring units of the vinyl stearate component.

The above polymer was tested as an additive in mineral oil. The table below compares its performance with mineral oil alone and with Acryloid 618 (a commercial acrylic resin oil additive).

Table

|  | Viscosity in centistokes | | ASTM slope | Viscosity index |
| --- | --- | --- | --- | --- |
|  | 100° C. | 210° C. | | |
| 2% norcamphanyl fumarate polymer | 40.96 | 7.02 | 0.71 | 124.5 |
| 2% Acryloid 618 | 28.35 | 5.45 | 0.69 | 139.0 |
| Mineral oil | 23.95 | 4.32 | 0.77 | 92.2 |

The first column shows the difference in viscosity of the oil at two different temperatures, with and without the specified additives. The second column is an indication of the rate of change of the viscosity with temperature. A small numerical value is desirable. The viscosity index of the last column is an empirical number indicating the effect of change of temperature on the viscosity of an oil. A low viscosity index signifies a relatively large change of viscosity with temperature. Thus, it will be seen that the copolymer of above Example 6 improves the mineral oil in every case, and in addition shows superiority in producing and maintaining a relatively higher viscosity over the temperature range of 100–210° C. than shown by the comparison samples.

EXAMPLE 10

Using the method of preparation, purification and oil additive testing of Example 9, a gum-like copolymer prepared from a mixture of 23.4 g. (0.075 mole) of bis-(2-norcamphanyl)fumarate, 15.5 g. (0.075 mole) of vinyl stearate, 200 ml. tert.-butyl alcohol and 0.5 g. of benzoyl peroxide showed a viscosity value of 28.87 at 100° C. and 5.03 at 210° C., an ASTM slope of 0.73 and a viscosity index of 112.1.

EXAMPLE 11

A mixture of 8 g. of bis(2-norcamphanylmethyl)-fumarate, 32 g. of styrene, 200 ml. of toluene and 0.4 g. of azo-bis-isobutyronitrile was tumbled in a pressure bottle at 70° C. for 24 hours. A clear, viscous dope was obtained which was poured into acetonitrile to precipitate the polymer. After separation and drying, the copolymer product weighed 37.6 g. It consisted of approximately 20% by weight of recurring units of bis(2-norcamphanylmethyl) fumarate, the remainder of the copolymer molecule being recurring styrene units, and was thermoplastic. On compression molding, the copolymer gave clear, hard molded objects.

EXAMPLE 12

A mixture of 23.4 g. (0.075 mole) of bis(2-norcamphanyl) maleate, 7.5 g. (0.075 mole) of isopropenyl acetate, 100 ml. of tert.-butyl alcohol and 0.3 g. of benzoyl peroxide was heated at reflux in a 250-ml. flask for 12 hours. A clear, viscous dope was obtained which was poured into acetonitrile to precipitate the copolymer. After drying, the copolymer product weighed 29.4 g. It contained approximately 76% by weight of recurring units of bis(2-norcamphanyl) maleate, the remainder of the copolymer molecule being recurring isopropenyl units, and was thermoplastic. It was useful primarily as an additive to synthetic lubricants.

EXAMPLE 13

A mixture of 5 g. of bis(2-norcamphanylmethyl) maleate, 35 g. of vinyl acetate, 400 ml. of water, 0.4 g. of ammonium persulfate, 0.2 g. of sodium bisulfite and 0.4 g. of sulfonated mineral oil was tumbled in a pressure bottle at 55° C. for 20 hours. A milky emulsion of copolymer was obtained from which clear, flexible films were readily cast.

EXAMPLE 14

A mixture of 5 g. of bis(6-methyl-2-norcamphanyl) fumarate, 45 g. of methyl methacrylate, 300 ml. of acetone and 0.5 g. of acetyl peroxide was tumbled in a pressure bottle at 60° C. for 10 hours. The resulting copolymer contained approximately 10% by weight of the above fumarate component. It was isolated by evaporating the solvent. A yield of 48.8 g. of copolymer was obtained. It was thermoplastic and molded readily to give clear, hard molded objects.

EXAMPLE 15

A mixture of 10 parts by weight of bis(2-norcamphanylmethyl) fumarate and 90 parts by weight of acrylonitrile was added slowly over a period of one hour at 60° C. to a stirred solution containing by weight 400 parts water, 1 part of potassium persulfate, 0.5 part of sodium bisulfite and 2 parts of lauryl alcohol sulfate. At the end of 6 hours, the copolymer containing approximately 10% by weight of the fumarate component was isolated by pouring the emulsion into a 20% solution of sodium sulfate, washed and dried. The yield was 97 g. of copolymer. It had a softening point of approximately 225°–230° C. A dope of the copolymer in dimethylformamide was wet-spun into fibers which after drafting had a tenacity of 3.2 g./denier and an elongation of 18%.

EXAMPLE 16

A mixture of 25 g. of bis(2-norcamphanyl) fumarate, 75 g. of vinyl chloride, 400 ml. of tert.-butyl alcohol and 1.0 g. of benzoyl peroxide was tumbled in a pressure bottle at 55° C. for 18 hours. The resulting copolymer was isolated by pouring the reaction mixture into acetonitrile, followed by filtering off the precipitate, washing and drying. A yield of 88 g. of white copolymer was obtained. It contained 79% of the vinyl chloride component as shown by chlorine analysis and was an excellent molding material.

EXAMPLE 17

A mixture of 90 g. of bis(2-norcamphanyl) fumarate, 10 g. of vinyl stearate, 500 ml. of tert.-butyl alcohol and 1.0 g. of azo-bis-isobutyronitrile was tumbled in a pressure bottle at 60° C. for 24 hours. The copolymer was isolated by pouring into acetonitrile and purified as described in above Example 9. It contained approximately 90% by weight of the above fumarate component, the remainder of the copolymer molecule being the vinyl stearate component. This product was readily soluble in mineral oil and was useful as an oil additive.

EXAMPLE 18

A mixture of 20 g. of bis(6-methyl-2-norcamphanyl) itaconate, 50 g. of vinyl acetate, 200 ml. of tert.-butyl alcohol and 0.5 g. of benzoyl peroxide was refluxed for 10 hours in a flask equipped with a reflux condenser. The resulting copolymer was obtained by precipitating the reaction mixture into methanol. A yield of 61 g. of a soft gum was obtained. It contained approximately 28% by weight of the above fumarate component and was readily soluble in chloroform.

By proceeding as described in the above examples, other of the mentioned monomers and corresponding polymers thereof can be prepared. Where the polymers are gum-like in character, these are generally useful as mineral oil additives and as plasticizing agents, and in cases where the polymers are solids as in the case of certain copolymers these are useful for preparing films, sheets and molded objects. The copolymers with acrylonitrile containing at least 70% of the acrylonitrile component are particularly useful for the preparation of filaments and fibers. The polymers of the invention can be extruded from their melts or cast from solutions thereof in appropriate solvents. Those polymers giving flexible tough films are also useful as photographic film support materials. Suitable fillers, dyes, pigments, softening agents, etc. can be incorporated, if desired, into the copolymer compositions.

The invention has been described in detail with particular reference to preferred embodiments thereof, but it will be understood that variations and modifications can be effected within the spirit and scope of the invention as described hereinabove and as defined in the appended claims.

What we claim is:

1. A thermoplastic copolymer of from 10–90% by weight of an unsaturated ester selected from those represented by the following general formulas:

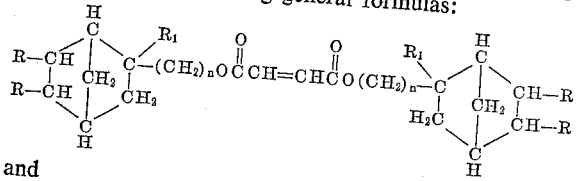

and

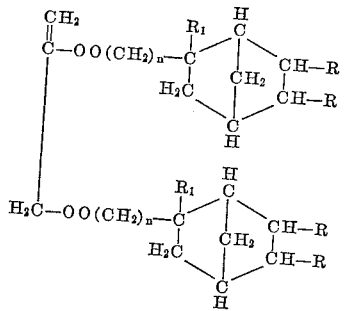

wherein $n$ represents an integer selected from 0 and 1, each R represents the same member selected from the group consisting of an atom of hydrogen, and an alkyl group of from 1–4 carbon atoms, and each $R_1$ represents the same member selected from the group consisting of an atom of hydrogen and a methyl group, and conversely from 90–10% by weight of a polymerizable monomeric compound selected from the group consisting of a vinyl ester of a saturated fatty acid containing from 2–18 carbon atoms, an isopropenyl ester of a saturated fatty acid containing from 2–18 carbon atoms, an alkyl acrylate wherein the said alkyl group contains from 1–4 carbon atoms, an alkyl methacrylate wherein the said alkyl group contains from 1–4 carbon atoms, styrene, acrylonitrile, methacrylonitrile and vinyl chloride.

2. A thermoplastic copolymer of from 10–90% by weight of bis(2-norcamphanylmethyl) fumarate and conversely from 90–10% by weight of vinyl stearate.

3. A thermoplastic copolymer of from 10–90% by weight of bis(2-norcamphanylmethyl) fumarate and conversely from 90–10% by weight of styrene.

4. A thermoplastic copolymer of from 10–90% by weight of bis(6-methyl-2-norcamphanyl) fumarate and conversely from 90–10% by weight of methyl methacrylate.

5. A thermoplastic copolymer of from 10–90% by weight of bis(2-norcamphanylmethyl) fumarate and conversely from 90–10% by weight of acrylonitrile.

6. A thermoplastic copolymer of from 10–90% by weight of bis(6-methyl-2-norcamphanyl) itaconate and conversely from 90–10% by weight of vinyl acetate.

References Cited in the file of this patent

UNITED STATES PATENTS

| | | |
|---|---|---|
| 2,098,190 | Kyrides | Nov. 2, 1937 |
| 2,366,495 | D'Alelio | Jan. 2, 1945 |
| 2,683,126 | Nichols | July 6, 1954 |
| 2,744,098 | Towne | May 1, 1956 |
| 2,892,858 | Ziegler | June 30, 1959 |
| 2,912,458 | Brannock | Nov. 10, 1959 |
| 2,926,806 | Marvel et al. | Mar. 22, 1960 |

FOREIGN PATENTS

| | | |
|---|---|---|
| 487,593 | Great Britain | June 22, 1938 |